United States Patent [19]

Lee

[11] Patent Number: 5,067,147
[45] Date of Patent: Nov. 19, 1991

[54] MICROCELL SYSTEM FOR CELLULAR TELEPHONE SYSTEM

[75] Inventor: William C. Lee, Corona Del Mar, Calif.

[73] Assignee: PacTel Corporation, San Francisco, Calif.

[21] Appl. No.: 693,779

[22] Filed: Apr. 26, 1991

Related U.S. Application Data

[63] Continuation of Ser. No. 432,800, Nov. 7, 1989, abandoned, which is a continuation-in-part of Ser. No. 307,070, Feb. 6, 1989, Pat. No. 4,932,049.

[51] Int. Cl.$^5$ .......................................... H04M 11/00
[52] U.S. Cl. ...................................... 379/60; 379/59; 455/33
[58] Field of Search .................................. 379/58-60, 379/63; 455/33

[56] References Cited

U.S. PATENT DOCUMENTS

| | | | |
|---|---|---|---|
| 4,144,409 | 3/1979 | Utono et al. | 379/60 |
| 4,144,411 | 3/1979 | Frenkiel | 379/60 |
| 4,485,486 | 11/1984 | Webb et al. | 455/33 |
| 4,704,734 | 11/1987 | Mench et al. | 455/33 |
| 4,727,590 | 2/1988 | Kowano et al. | 455/33 |
| 4,759,051 | 7/1988 | Han | 455/33 |
| 4,771,448 | 9/1988 | Koolgoli et al. | 379/60 |
| 4,775,998 | 10/1988 | Felix et al. | 379/59 |
| 4,790,000 | 12/1988 | Kinoshita | 379/59 |
| 4,794,635 | 12/1988 | Hess | 379/60 |
| 4,799,253 | 1/1989 | Stern et al. | 379/59 |

FOREIGN PATENT DOCUMENTS 0042932 2/1989 Japan ...................................... 455/33

OTHER PUBLICATIONS

Publication: IEEE Communications Magazine, vol. 24, No. 2, "Cellular System Design: An Emerging Engineering Discipline", Whitehead, Feb. 1986, pp. 8-15.

Publication from: Nordic Seminar on Digital Land Mobile Radio Communication, 'Calculation of Capacity and Co-Channel Interference in a Cellular System', by Stjernvall, pp. 209-215, 217, Feb. 1985.

IEEE publication, 'A New Method Which Optimizes Frequency Reuse in Cellular Radio Systems', by Suzuki et al., pp. 322-327, 1984.

Primary Examiner—James L. Dwyer
Assistant Examiner—Dwayne D. Bost
Attorney, Agent, or Firm—McCubbrey, Bartels, Meyer & Ward

[57] ABSTRACT

An improved microcell system for cellular telephone systems has a plurality of contiguous cells wherein the cells are configured in a plurality of clusters with each cell in a cluster having a different assigned set of transmission frequencies. Each of the frequencies in an assigned set for a given cell is assignable to a given mobile telephone within the cell for all locations of the mobile telephone within the cell. Frequency handoff circuitry is provided for maintaining continuous communication with mobile telephones moving from cell to cell. Each of the cells is provided with a plurality of antennas each of which is arranged and configured to limit propagation of signals substantially to one of a plurality of regions within the boundaries of the cell, which regions are substantially less in area than the area of the cell. Transmission at any one frequency of the set of transmission frequencies assigned to a cell is confined to the zone wherein the strongest signal is received from the mobile telephone to which such one frequency has been assigned. Accordingly, the clusters of cells may be arranged with a frequency reuse pattern of three and a ratio of co-channel separation to cell radius of less than four.

2 Claims, 6 Drawing Sheets

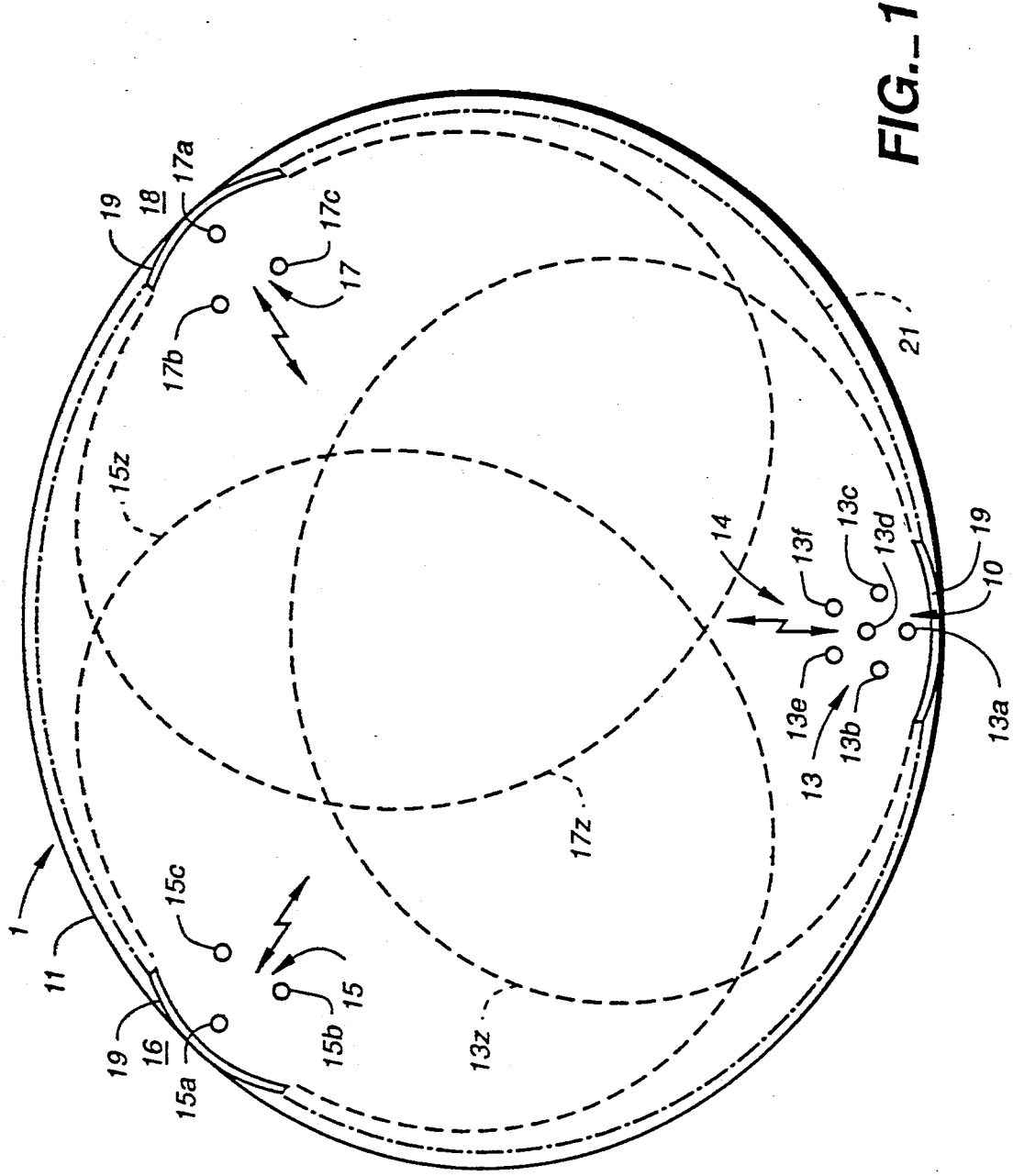
FIG._1

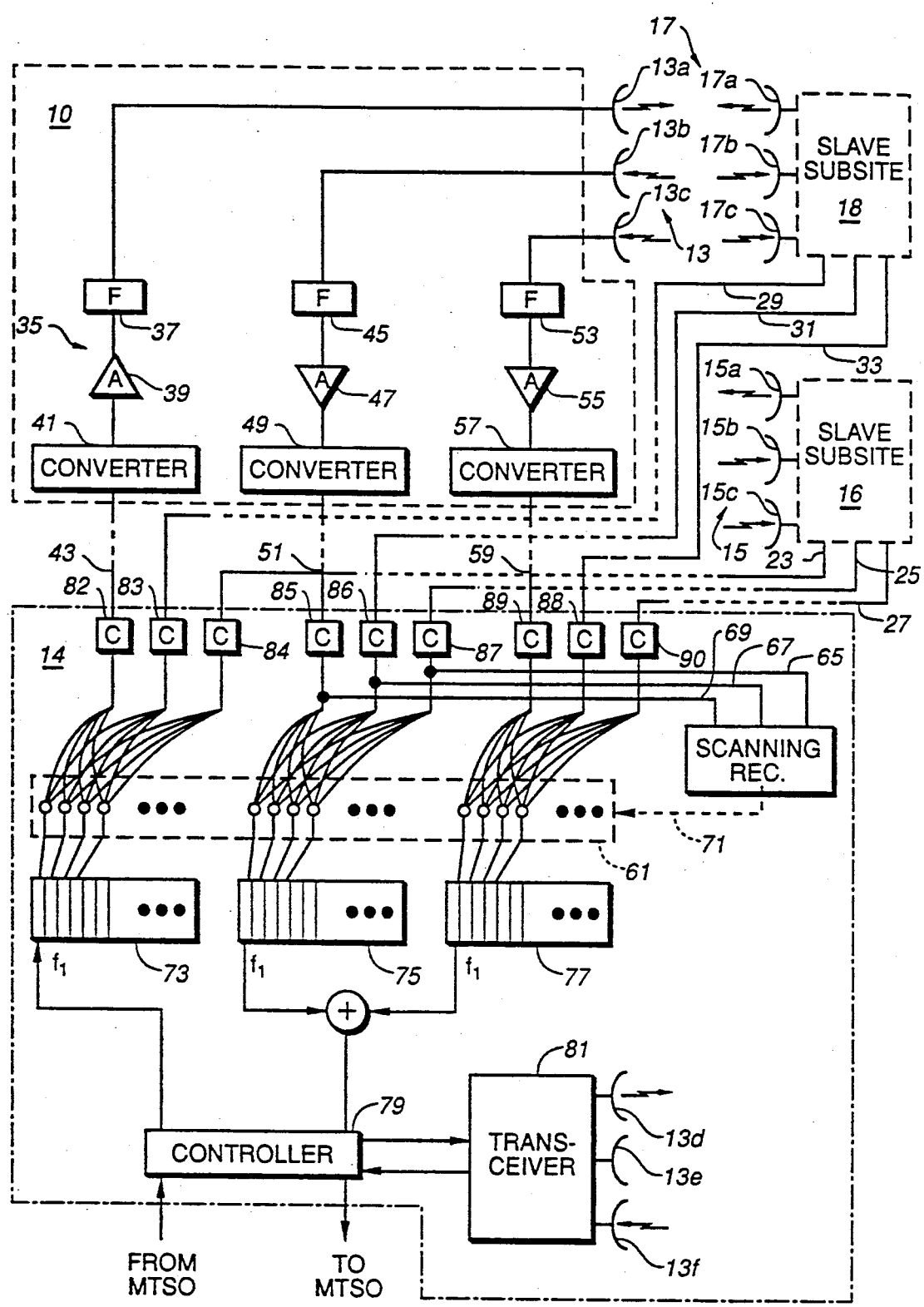
FIG._2

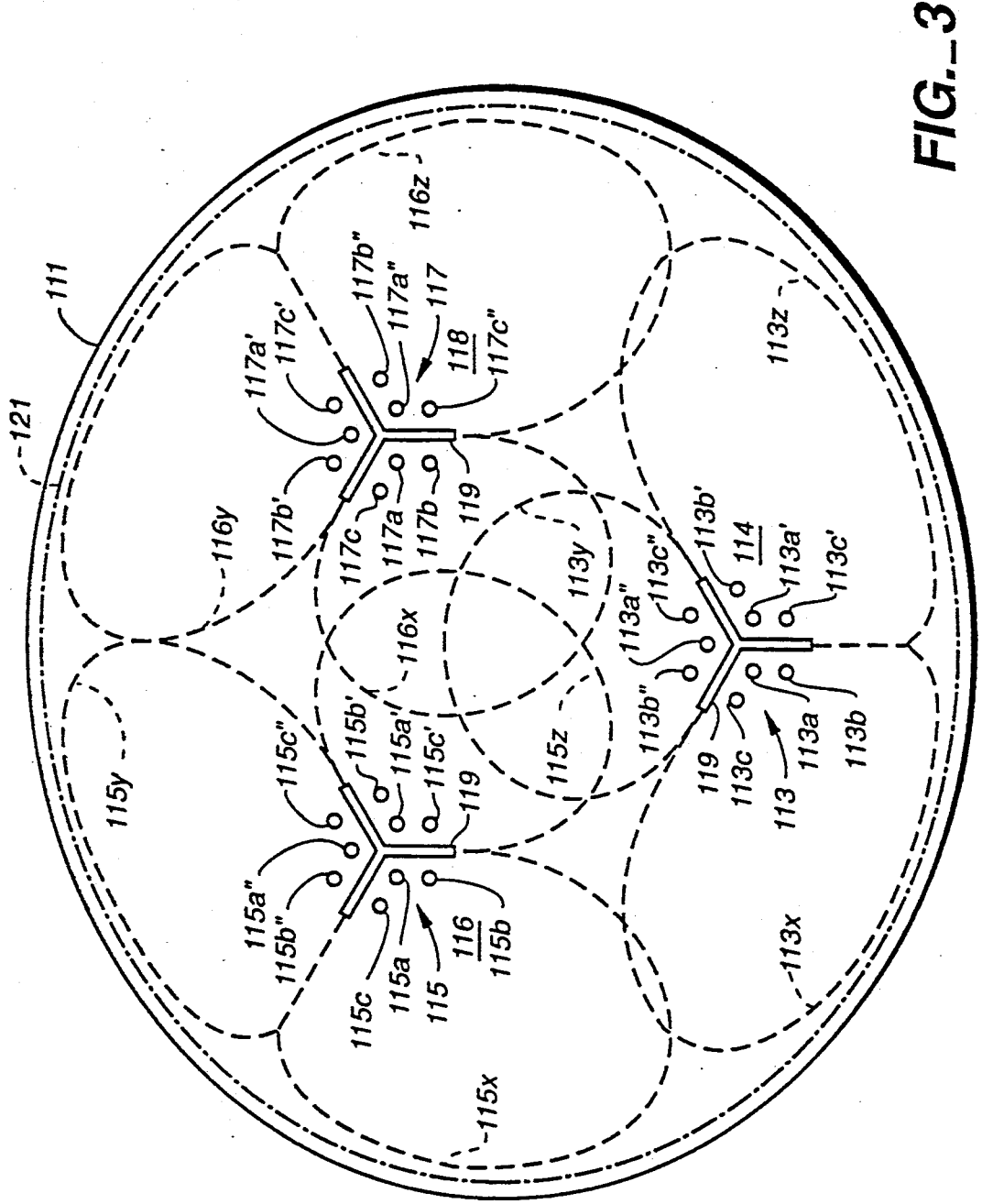
FIG._3

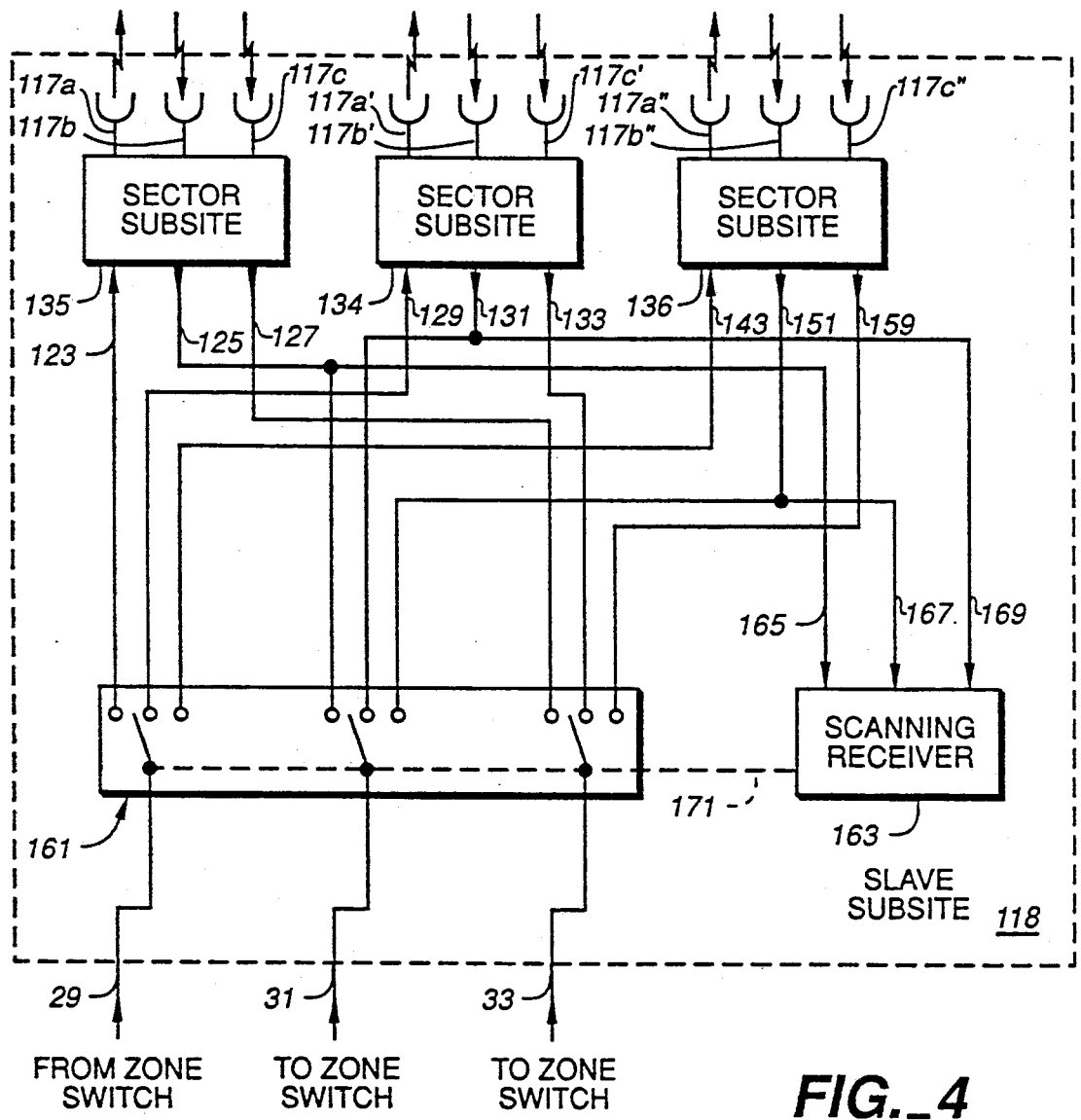
FIG._4

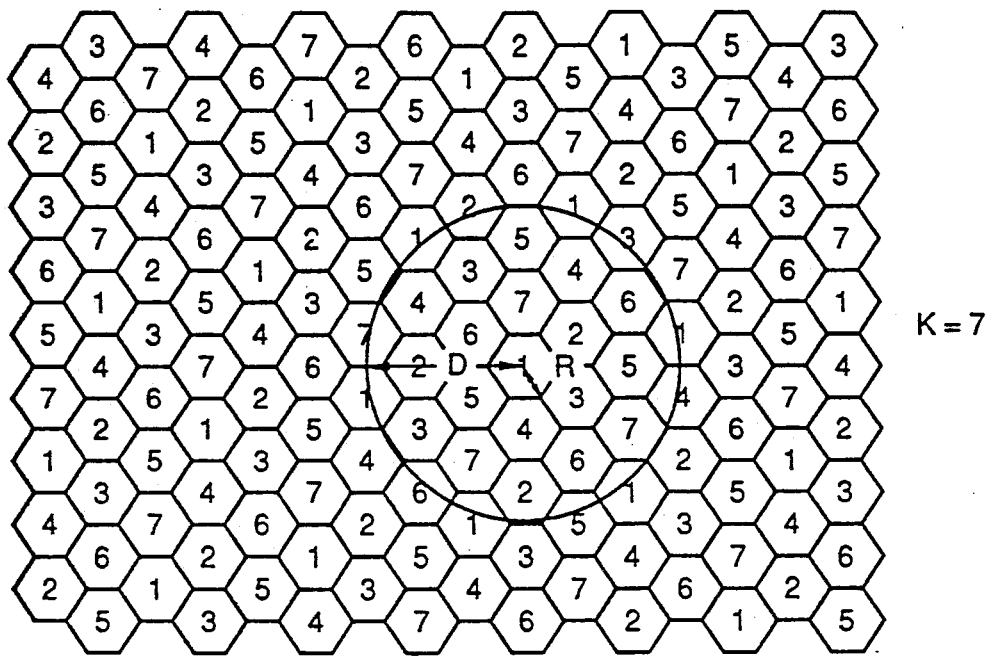
FIG._5
(PRIOR ART)
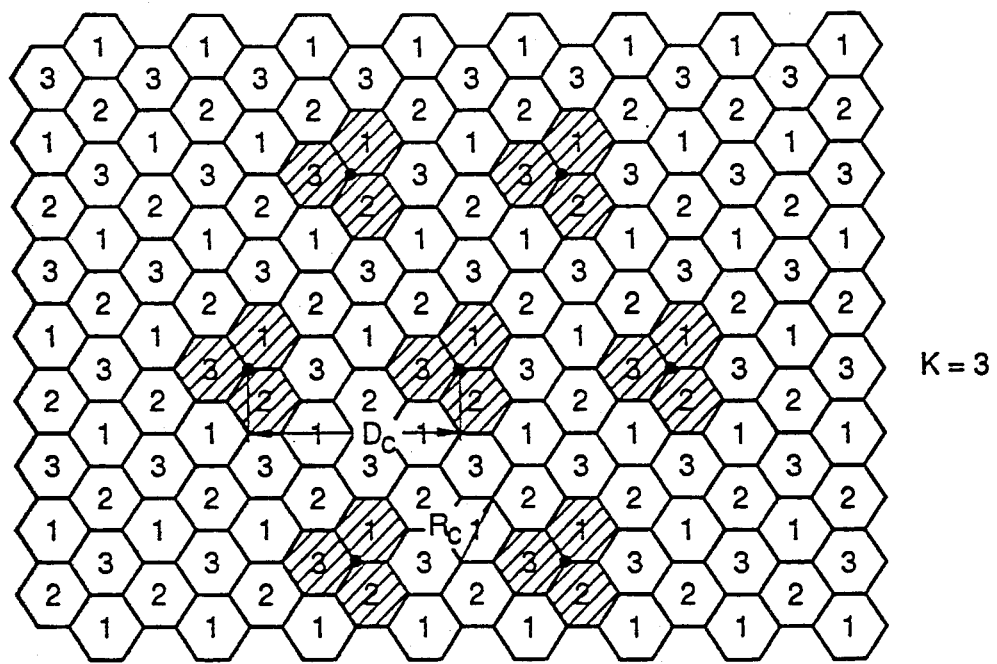
FIG._7

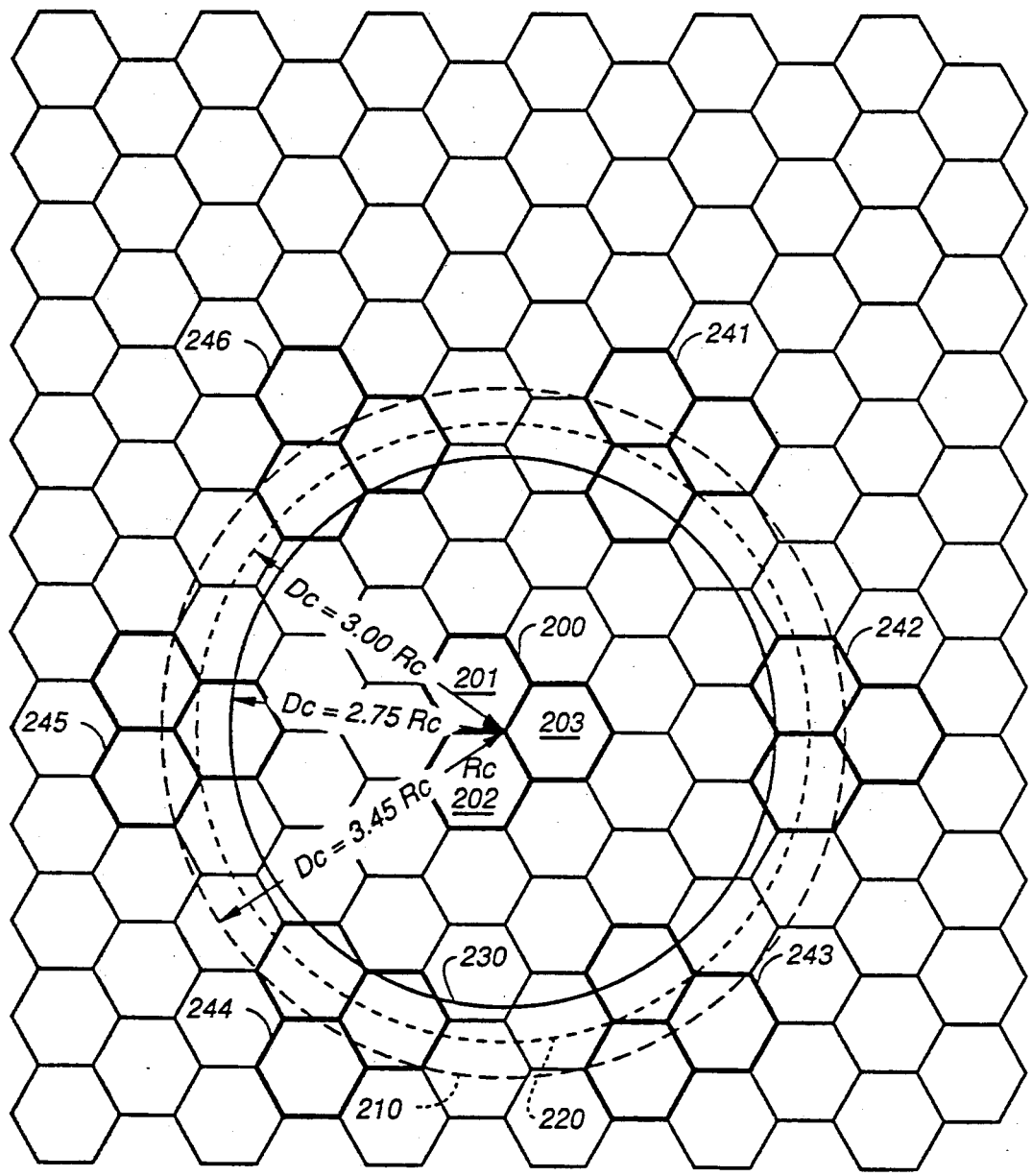
FIG._6

MICROCELL SYSTEM FOR CELLULAR TELEPHONE SYSTEM

This application is a continuation of application Ser. No. 432,800, filed Nov. 7, 1989, now abandoned, which is a continuation-in-part of application Ser. No. 307,070, filed Feb. 6, 1989, U.S. Pat. No. 4,932,049, with issue date June 5, 1990 entitled Cellular Telephone System.

This invention relates to cellular telephone systems of the type wherein a plurality of contiguous cells, each having a different assigned set of transmission frequencies, are arranged with handoff means for maintaining continuous communication with mobile telephones moving from cell to cell. More particularly, the invention relates to an improved microcell configuration for cellular telephone systems which avoids interference while increasing system capacity.

BACKGROUND OF THE INVENTION

In a typical cellular telephone system, as a mobile unit travels along a path that passes from one cell to another, a handoff occurs. The handoff action is controlled by a mobile telephone switching office (MTSO) which receives a handoff command or instruction. The handoff command is typically generated when the signal received from the mobile telephone falls below a preselected signal strength thus indicating that the mobile telephone is at the cell boundary.

Each cell in a cellular telephone system operates with a different assigned set of transmission frequencies. As a mobile telephone passes from one cell to another, the handoff signal instructs the cell which the mobile telephone is entering to begin transmitting at a frequency which is different from the frequency which was being transmitted by the cell which the mobile telephone is leaving. A similar procedure is followed when the mobile telephone passes into the next contiguous cell. Sets of assigned frequencies are different for adjacent cells, and such sets are not repeated except for cells that are far enough away from each other so that interference problems will not occur.

A mobile telephone unit typically contains a control unit, a transceiver, and an antenna system. Each cell site typically is provided with a control unit, radio cabinets, a power plant, data terminals, and antennas. The MTSO provides coordination for all the cell sites and contains suitable processing and switching means. The MTSO also interfaces with the telephone company zone offices for standard hardwired telephone systems. The communication links between the MTSO and the various cell sites are typically microwave, T carriers, or optical fiber, and carry both voice and control data between the cell sites and the MTSO.

When a user sitting in a car activates the receiver of the mobile unit, the receiver scans a plurality of set-up channels which are designated among the total channels assigned to the cell. Typically, there may be 21 set-up channels out of a total of 416 channels. (The remainder are communication channels.) The receiver then selects the strongest set-up channel and locks on for a certain time. Each site is assigned a different set-up channel. Accordingly, locking onto the strongest set-up channel usually means selecting the nearest cell site. This self-location scheme is used in the idle stage and is user-independent. It has a great advantage because it eliminates the load on the transmission at the cell site for locating the mobile unit. The disadvantage of the self-location scheme is that no location information of idle mobile units appears at each cell site. Therefore, when the call initiates from a standard non-mobile or land line to a mobile unit, the paging process is longer. Since a large percentage of calls originates at the mobile unit, the use of self-location schemes is justified. After a delay (for example, one minute) the self-location procedure is repeated.

To make a call from a mobile unit, the user places the called number into an originating register in the mobile unit, checks to see that the number is correct, and pushes a "send" button. A request for service is sent on a selected set-up channel obtained from a self-location scheme as described above. The cell site receives it, and in directional cell sites, selects the best directive antenna for the voice channel to use. At the same time the cell site sends a request to the MTSO via a high-speed data link. The MTSO selects an appropriate voice channel for the call, and the cell site acts on it through the best directive antenna to link the mobile unit. The MTSO also connects the wire-line party through the telephone company zone office.

When a land-line party dials a mobile unit number, the telephone company local office recognizes that the called number is mobile and forwards the call to the MTSO. The MTSO sends a paging message to certain cell sites based on the mobile unit number and a suitable search algorithm. Each cell site transmits the page on its own set-up channel. The mobile unit recognizes its own identification on a strong set-up channel, locks onto it, and responds to the cell site. The mobile unit also follows the instruction to tune to an assigned voice channel and initiate user alert.

When the mobile user turns off the transmitter, a particular signal (signaling tone) transmits to the cell site and both sides free the voice channel. The mobile unit resumes monitoring pages through the strongest set-up channel.

During a call, two parties are on a voice channel. When the mobile unit moves out of the coverage area of a particular cell site, the reception becomes weak. The present cell site requests a handoff via an appropriate signal, for example, a 100 ms burst on the voice channel. The system switches the call to a new frequency channel in a new cell site without either interrupting the call or alerting the user. The call continues as long as the user is talking. The user does not notice the handoff occurrences.

When call traffic in a particular area increases, increased capacity may be generated by reducing the area covered by a particular cell. For example, if a cell is split into four smaller cells, each with a radius of one-half the original, traffic is increased four fold. Naturally, the smaller the cell, the more handoffs required in a cellular telephone system for a given capacity.

Although in the proper circumstances reduced cell size is advantageous, certain problems can arise. Very often when cell size is reduced, for example to a radius of less than one mile, very irregular signal strength coverage will result. This may be caused by buildings and other structures, and can therefore become highly dependent upon the location of the mobile unit. Other problems arise in connection with signal interference. Although some cellular telephone systems, in an attempt to improve coverage, have employed several sets of frequencies in a small single cell, this prevents the reuse of the same frequencies or adjacent frequencies in the neighboring cells. The overall capacity of the system thereby decreases, since the number of available channels in a system is proportional to the inverse of the number of different frequency sets employed.

In U.S. Pat. No. 4,932,049, with issue date June 5, 1990 and the continuation-in-part based thereon, application Ser. No. 432,511, filed Nov. 7, 1989, cellular telephone systems are described in which an antenna set configuration leads to a more uniform signal coverage contour and lowered interference levels. In those applications, a cellular telephone system is described incorporating a cell which contains a plurality of antenna sets arranged and configured to limit propagation of signals substantially to one of a plurality of zones or sectors within the boundaries of the cells. The zones or sectors are substantially less in area than the area of the cell. Transmission at any one frequency (of the assigned set of transmission frequencies for the cell) is confined to the zone or sector wherein the strongest signal is received from the mobile telephone to which such one frequency has been assigned.

SUMMARY OF THE INVENTION

The present invention takes advantage of the significant reduction in the effective radiation radius for each frequency resulting from such a cell configuration, with a consequent lowering of the interference level. Since the frequency at which transmission occurs for a given mobile unit does not change so long as that mobile unit remains within the cell, and since the propagation radius is effectively lowered, a completely different frequency reuse pattern becomes attainable.

The present invention comprises a plurality of contiguous cells, said cells being arranged in a plurality of clusters wherein each cell in a cluster has a different assigned set of transmission frequencies. Each transmission frequency is assignable to a given mobile telephone within the cell for all locations of said given mobile telephone within the cell. Frequency handoff means are provided for maintaining continuous communication with mobile telephones moving from cell to cell. Each of the cells is provided with antennas arranged and configured to limit propagation of signals substantially to one of a plurality of zones within the boundaries of the cell. The zones are substantially less in area than the cell. The frequency assigned to a given mobile telephone unit will not change when the unit moves from zone to zone. Transmission at any one frequency of the assigned set of transmission frequencies for a particular cell is confined to the region wherein the strongest signal is received from the mobile telephone to which such one frequency has been assigned. The cell cluster is arranged with a frequency reuse pattern of three and a ratio of co-channel separation distance to cell radius of less than four.

BRIEF DESCRIPTION OF THE DRAWINGS

FIG. 1 is a schematic diagram of an embodiment of a cell configuration used in the system of the present invention.

FIG. 2 is a schematic block diagram of the electronics of a cell used in the system of the present invention.

FIG. 3 shows schematically a further embodiment of a cell used in the present invention wherein a cell includes three separate antenna subsets at each antenna site.

FIG. 4 is a block diagram of the electronics associated with one of the slave sub-sites in an embodiment of the present invention.

FIG. 5 is a diagram of a prior art cellular telephone system cell configuration.

FIG. 6 illustrates an embodiment of the present invention showing the cell configuration with each cell divided into three zones.

FIG. 7 illustrates a cell configuration utilizing a frequency reuse pattern equal to 3 according to the present invention.

DETAILED DESCRIPTION OF THE INVENTION

FIG. 1 is a schematic illustration of a cell 1 constructed in accordance with the present invention. The outer boundary of cell 1 is delineated by a circle 11 in solid line. Although shown as a circle, cells are often represented as hexagons in cell design schemes. In reality, however, due to the terrain and the presence of buildings and other structures, the actual boundary of cell 1 may have an irregular shape. In any case, solid line circle 11 is intended to represent the locus at which a mobile telephone unit passes from the influence of the illustrated cell into the influence of an adjacent cell.

Three separate antenna sets 13, 15, and 17 are positioned within the cell 11. Antenna sets 13, 15, and 17 are located at slave sub-sites 10, 16, and 18, respectively. Depending upon the particular conditions within the cell area, other numbers of antenna sets may be usefully employed, and it is to be understood that the use of three sets in FIG. 1 is for illustrative purposes only. Each antenna set includes a transmitting antenna 13a, 15a, and 17a, respectively. Each antenna set also includes two receiving antennas 13b and 13c, 15b and 15c, and 17b and 17c, respectively. Duplication of the receiving antennas at each sub-site is for diversity use to reduce signal fading by combining the signals. In addition, antenna set 13 includes a control-channel transmitting antenna 13d for transmitting control signals, and duplicate control-channel receiving antennas 13e and 13f for receiving control signals, as will be explained below. Antenna sub-site 14 is called a master sub-site, whereas antenna sub-sites 10, 16, and 18 are called slave sub-sites. In the particular embodiment shown in FIG. 1, antenna set 13 is located at master sub-site 14, but it is understood that antenna set 13 may be located elsewhere within cell 1 as desired depending upon the particular environment. The determination of the locations of sub-sites and the number of sub-sites in a cell can be based on Lee's coverage prediction model published in IEEE Transactions on Vehicular Technology, February, 1988.

Each antenna set has its own zone of major influence for transmitting and receiving signals. Thus, antenna set 13 at slave sub-site 10, co-located with master sub-site 14, has a zone indicated by a dotted line 13z. Similarly, antenna set 15 at slave sub-site 16 has a zone of influence designated by a dotted line 15z, and antenna set 17 at slave sub-site 18 has a zone of influence designated by a dotted line 17z. It may be seen from FIG. 1 that the zones overlap in certain areas. Directionality is provided to the antenna sets so that the zones of influence (i.e., the zones of propagation and reception of signals) are limited to be substantially within the boundaries of cell 1. Such directionality is provided by suitable means such as shown as a symbolic means 19 arranged at each antenna set or sub-site. Directionality means 19 can be a reflector for each individual antenna, or any other suitable arrangement to provide the desired directionality and coverage. The set of control-channel antennas 13d, 13e, and 13f, however, is configured to have a greater zone of influence, this being indicated by a dash-dot line 21, substantially coextensive with the limits of cell 1 delineated by circle 11.

FIG. 2 is a schematic block diagram of the electronics of an embodiment of the present invention. The three slave sub-sites 10, 16, and 18 are each coupled to master sub-site 14 and are controlled therefrom. In the illustrated embodiment, slave sub-site 10 is connected to master sub-site 14 via three cables 43, 51, and 59. Slave sub-site 16 is connected to master sub-site 14 via three cables 23, 25, and 27. Slave sub-site 18 is connected to master sub-site 14 via cables 29, 31, and 33. Specifically, cable 43 is coupled to a converter 82, cable 29 is coupled to a converter 83, cable 23 is coupled to a converter 84, cable 51 is coupled to a converter 85, cable 31 is coupled to a converter 86, cable 25 is coupled to a converter 87, cable 59 is coupled to a converter 88, cable 33 is coupled to a converter 89, and cable 27 is coupled to a converter 90. Generally, cables 43, 23, and 29 carry transmitter antenna signals whereas cables 51, 59, 25, 27, 31, and 33, carry receiver antenna signals. The converters can up-convert or down-convert in frequency depending on the type of communication utilized between the slave sub-sites and the master sub-sites. The illustrated embodiment depicts the communication between the slave sub-sites and the master sub-site as being via cable. It will be apparent to those skilled in the art that such cables may include, for example, T1 carrier cables, optical fibers, or the like. The cables may also be replaced by microwave channels. For example, converter-converter operation between the slave sub-site and the master sub-site can be done be by (1) converting 800 MHz up to microwave and then converting down to 800 MHz, (2) converting 800 MHz to optical wave and then converting down to 800 MHz, and (3) converting 800 MHz down to 14 MHz baseband and then converting up to 800 MHz. If one of the slave sub-sites is co-located at the master sub-site, the converters can be eliminated.

The slave sub-sites each contain a signal processing ensemble of components as shown at 35 for slave sub-site 10. It is understood that substantially identical signal processing ensembles are contained in slave sub-sites 16 and 18, although such ensembles are not shown in FIG. 2 for simplicity. Signal processing ensemble 35 includes a filter 37, an amplifier 39, and a converter 41 coupled between antenna 13a and cable output 43. Similarly, filter 45, amplifier 47, and converter 49 are coupled between antenna 13b and output cable 51, and filter 53, amplifier 55, and converter 57 are coupled between antenna 13c and output cable 59. The filters, amplifiers, and converters filter, enhance, and convert signals as designed and may be of any type suitable for the stated purpose.

At master sub-site 14, all of the cable connections 23, 25, 27, 29, 31, 33, 43, 51, and 59, after going through converters 82-90, terminate at a zone exchange or zone switch 61. Connections are also made from each of the output cables 25, 31, and 51 to a scanning receiver 63 via connections 65, 67, and 69, respectively.

Scanning receiver 63 at master sub-site 14 scans all of the sub-sites 10, 16, and 18, and all of the frequency channels allocated in the particular set assigned to that cell. It then chooses the strongest signal levels among all sub-sites for each frequency channel. A zone exchanger or zone switch 61 links the transmit signal for a respective frequency to the desired sub-site and terminates the old sub-site transmitter. The received signal is also switched to the same new sub-site.

Unlike the sub-site antennas, the control-channel signal antennas cover the entire cell and are used for setting up calls in the conventional manner known to those skilled in the art. Further elaboration on such procedure, as well as on cellular telephone systems in general, may be found in the book *Mobile Cellular Telecommunications Systems*, by William C. Y. Lee, McGraw-Hill, New York, St. Louis, San Francisco, 1989.

Scanning receiver 63 provides an output control signal via a suitable connector 71 to the zone switch 61. Zone switch 61 may be of any suitable construction to provide switching between the respective sub-sites, which switching depends upon the strength of the signal being received at a sub-site as determined by scanning receiver 63. Master sub-site 14 further includes carrier frequency modules 73, 75, and 77. Module 73 is assigned to the transmitters and modules 75 and 77 are assigned to the receivers. Each module provides for the assigned set of carrier frequencies for the particular cell. For example, a portion of the 395 voice channels and one of the 21 control channels may be assigned to an individual cell.

The signals from the antennas received at modules 75 and 77 are combined and conducted to a controller 79. Controller 79 also provides signals to transmitter module 73. Controller 79 also determines which of the cables is connected to provide the received voice signals to the MTSO. Controller 79 is connected via suitable connections to and from the MTSO. In addition, controller 79 is connected to a transceiver 81 which transmits and receives signals on the three control antennas 13d, 13e, and 13f.

Controller 79 measures the signal strength of a channel requested by the MTSO. If the initial call is in this particular cell, or if the call is handed off to this particular cell through controller 79, the controller initiates transmission at a particular frequency assigned by the MTSO to that call. The frequency assigned is the one which has the lowest noise level as determined by the controller. If, during the call, the signal strength received from all the antenna sets is below a preselected level, the controller initiates a handoff procedure from the MTSO.

In operation, a mobile unit operating on an assigned frequency $f_1$ in the cell will typically be moving within the cell. All sub-sites within the cell will receive signal levels, but not necessarily the voice signals from the mobile unit. Only the sub-site at which the received signal level is the strongest will transmit and receive signals to the mobile unit and set up a call. When the mobile unit moves so that another sub-site receives the strongest signal, the system turns off the transmitter at the weaker sub-site and turns on the transmitter at the sub-site where the strongest signal is being received. The two-diversity receiver antennas are also switched to the proper sub-site to receive the call. The frequency, however, does not change and remains at $f_1$. Thus no handoff has occurred in the traditional sense and the MTSO is not involved. In this way, no additional handoff load is added to the MTSO switching equipment. If the signal strength from the mobile unit received by all the sub-sites is below a predetermined level, a handoff may be requested from the master sub-site to the MTSO.

The advantages accruing from the cell design of the present invention include a significant improvement in uniformity of coverage as opposed to cells in which only a single antenna site in each cell is employed. This becomes particularly advantageous in connection with a small cell, i.e., a cell having a radius of less than one mile. Since, by reducing the effective radiation area covered by each sub-site, the effective radiation radius for each frequency is reduced a consequent lowering of the interference level also results. All of this is accomplished without the necessity of handoffs within the cell itself. The frequency at which transmission occurs does not change in a cell, although the active sub-site in a cell switches from one to another according to signal level. This is accomplished in a relatively simple and economical way, and enables the size of a cell to be reduced to as low as 500 to 1000 feet in radius.

FIG. 3 shows schematically a further embodiment of the present invention wherein a cell, as in the case illustrated by FIG. 1, includes three separate antenna sets designated as 113, 115, and 117. The outer boundary of the cell is defined by a circle 111 (solid line). As mentioned in connection with the embodiment of FIG. 1, the cell, in reality, may be irregular in shape. The solid line 111 represents the boundary at which a mobile telephone unit passes from the influence of the illustrated cell to the influence of an adjacent cell.

In this embodiment, antenna set 113 is located at a master sub-site 114, whereas the antenna sets 115 and 117 are located at sub-sites 116 and 118, respectively. Master sub-site 114 can be co-located with any one of the slave sub-sites as desired. It is also understood that other numbers of antenna sets may be usefully employed and that the three sets shown in FIG. 3 are illustrative only.

Unlike the embodiment of FIG. 1 wherein each antenna set includes a single transmitting antenna and two receiving antennas, antenna sets 113, 115, and 117 each include a plurality of sub-sets of antennas which, in the illustrated embodiment, constitute three sub-sets at each sub-site. Each antenna sub-set includes a transmitting antenna designated respectively as 113a, 113a', 113a'', 115a, 115a', 115a'', 117a, 117a', and 117a'', respectively. Each antenna set also includes two receiving antennas, designated as 113b, 113b', 113b'', 113c, 113c', 113c'', 115b, 115b', 115b'', 115c, 115c', 115c'', 117b, 117b', 117b'', and 117c, 117c', 117c'', respectively. Duplication of the receiving antennas at each sub-set is for diversity use to reduce signal fading by combining the signals. The determination of the locations of sub-sites, the number of sub-sites in a cell, and the number of antenna sub-sets at each sub-site can be based on the Lee coverage prediction model published in IEEE Transactions on Vehicular Technology, February, 1988.

Cell 111 also includes an antenna set (not shown) for transmitting and receiving control signals as explained above in connection with antenna set 13 of FIG. 1 for transmitting and receiving signals to a suitable controller (not shown). As was the case in connection with FIG. 1, such control-channel antennas are configured to have a zone of influence substantially coextensive with the limits of cell 111 as indicated by the dash-dot line 121.

As was the case with the embodiment of FIG. 1, each antenna set has its own zone of major influence for transmitting and receiving signals. Unlike the embodiment of FIG. 1, however, each antenna set in the embodiment of FIG. 3 has its zone of major influence sub-divided into a plurality of substantially separate sectors. Thus, the zone of influence related to sub-site 114 is comprised of three sectors 113x, 113y, and 113z. Sector 113x is serviced by the antenna sub-set 113a, 113b, and 113c. Sector 113y is serviced by the antenna sub-set 113a'', 113b'', and 113c'', Sector 113z is serviced by the antenna sub-set 113a', 113b', and 113c'. The zone of influence of the other sub-sites 116 and 118 in FIG. 3 are similarly constituted by sectors given appropriate designations consistent with those in connection with sub-site 114.

It may be seen from FIG. 3 that the antenna sub-sites are positioned displaced inwardly from the periphery of cell 111 and that the sectors overlap in certain areas. Directionality is provided to the antenna sub-set so that the sectors associated with the sub-sets, i.e., the zones of propagation and reception of signals, are limited to be substantially within the boundaries of the zone serviced by that particular sub-site. Moreover, as was the case shown in FIG. 1, the sectors are also limited to be substantially within the boundaries of cell 111. Directionality is provided by suitable means such as shown by a symbolic means 119 arranged at each antenna set or sub-site. As illustrated in FIG. 3, directionality means 119 constitutes reflectors at each sub-site which divide the respective sectors at approximately 120° segments. However, it is to be understood that any other suitable arrangement to provide a desired directionality and coverage may be employed within the spirit and scope of the invention. Of course, the strength of the signal transmitted at each antenna sub-site may also be appropriately adjusted to provide the desired sector coverage.

FIG. 4 is a block diagram of the electronics associated with one of the slave sub-sites 117 of FIG. 3. It is to be understood that slave sub-site 118 illustrated in FIG. 4 is connected in the system of the invention substantially as shown in FIG. 2 in connection with slave sub-site 18. To clarify this, leads 29, 31, and 33 have been designated in FIG. 4. Generally, cable 29 carries transmitter antenna signals whereas cables 31 and 33 carry receiver antenna signals. It is to be understood that, in the case of a master sub-site, in addition to the elements illustrated in FIG. 4, elements as illustrated and described in connection with FIG. 2 would also be incorporated.

The three sub-sets of the antenna set 117 are designated with the identical nomenclature of FIG. 3. Each of the antenna sub-sets is connected to a respective one of a plurality of sector sub-sites 134, 135, and 136. Each of the sector sub-sites contains a signal processing section substantially similar to the signal processing section 35 illustrated in FIG. 2 but without the converters. Suitable cable connections 123, 125, 127, 129, 131, 133, 143, 151, and 159, provide connection between the various sector sub-sites and a three 3-port sector switch 161. In addition, connection is made for receiver signals via cables 125, 131, and 151, to a scanning receiver 163 via connections 165, 167, and 169, respectively. Scanning receiver 163 provides an output control signal, via a suitable connector 171, to the sector switch 161. Sector switch 161 may be of any suitable construction to provide switching between the respective sector sub-sites 134, 135, and 136, which switching depends upon the strength of the signal being received at a respective sector sub-site as determined by scanning receiver 163.

The present invention thus provides two levels of discrimination for the strength of the signals at each of the frequencies within the assigned set for the cell. Signal strength discrimination occurs at each antenna sub-site and determines which sub-set of antennas at that sub-site will be operational. At the same time, there is discrimination between sub-sites to determine which sub-site will be operational. Thus, only that sector within the cell at which the strongest signal is being received will transmit and receive signals to the mobile unit and set up a call. Once the mobile unit moves such that the received signal strength at a particular sector other than the one that is currently transmitting becomes the strongest, the system operates to turn off the transmitter associated with the weaker sector and turn on the transmitter associated with the sector at which the strongest signal level is being received. The two diversity receiver antennas associated with that particular sector are also switched to receive the call. In some circumstances, the receivers at each sector need not be turned off. The frequency, however, does not change and remains the same throughout the cell for a given mobile unit. Thus, no handoff occurs in the traditional sense and the MTSO is not involved. No additional handoff load is added to the MTSO switching equipment as a result of the foregoing described sub-division of the cells.

Referring now to FIG. 5, the cell layout of a conventional prior art system is illustrated. Cell layouts are characterized by a frequency reuse pattern which is a cluster of K cells in a particular configuration, each cell using a particular frequency set. In the system of FIG. 5, a frequency reuse pattern of seven frequency channel sets (K=7) is employed. Each set of channels operates throughout the entire cell from one cell site within the cell. The seven frequency channel sets are configured as shown in the pattern in FIG. 5 to provide maximum separation between cells using the same frequency set (called "co-channels") so as to minimize interference. These co-channel cells are denoted by the same number in FIG. 5. The co-channel separation distance is the distance from the centers of cells with the same number.

Government regulations allocate a frequency spectrum to cellular voice channels. At the present time in the U.S., 21 control channels and 395 voice channels are available for cellular telephone systems. The co-channel separation distance (denoted by D in FIG. 5) divided by the cell radius (denoted by R in FIG. 5) is 4.6. This avoids interference between co-channels based on a required carrier-to-noise ratio of 18 dB. If D/R is 4.6, it can be shown that the frequency reuse pattern K, which is a cluster of K cells sharing the whole spectrum, will be equal to 7. For details, see W.C.Y. Lee, *Mobile Cellular Telecommunications Systems*, pp. 50–59, McGraw-Hill 1989.

From the above, the channel capacity M may then be calculated as follows:

$$M = B_t/(B_c K),$$

where $B_t$=the total frequency spectrum allocated to cellular voice channels, $B_c$=the channel bandwidth, and K=the frequency reuse pattern using the above equation.

For an allocated frequency spectrum $B_t$ of 11.85 MHz and a channel bandwidth $B_c$ of 30 KHz, a frequency reuse pattern of K=7 provides M=56 channels per cell.

Assuming a mobile unit has a transmission radius $R_1$ and therefore may transmit a distance $R_1$ from the edge of a zone in which the mobile unit is moving, the co-channels zones must be separated by a distance equal to $4.6 \times R_1$.

In embodiments of the system of the present invention, each cell is divided into a plurality of zones or sectors wherein the zone or sector transmitter power covers only its own zone or sector. Within the cell itself, no handoffs take place. Thus, a mobile unit moving within the cell will not change frequency channels while it is within that cell, but only switches to different antenna sets within the cell according to the zone or sector coverage of the antenna sets.

FIG. 6 illustrates an embodiment of the present invention wherein each cell is divided into, for example, three zones. A cell 200 is denoted by the thick solid line encompassing three zones 201, 202, and 203. Although zones 201–203 are shown as hexagonal in shape, it is understood that the zones may be of any shape, even highly irregular, depending on the particular environment, as discussed previously, and that there may be any number of zones. The separation distance between two co-channel zones $D_z$ represents co-channel interference reduction whereas $D_c$ is the separation between two co-channel cells. Since the transmitted power coverage in each zone is smaller than that covered in each cell, the distance between zones can be substantially smaller. In order to avoid interference between co-channel zones, the ratio of zone distance $D_z$ to zone radius $R_z$ must be equal to 4.6. But because only the co-channel zones are required to be equal to 4.6, the co-channel cell separation can be such that the ratio $D_c/R_c$ is equal to 3.45. Thus, the dashed line 210 represents a circle having a radius of $D_c = 3.45 \times R_c$. In one embodiment of the present invention, a circle having a "comfortable separation" ratio of $D_c/R_c$ which is substantially equal to 3 is operable. This is shown as a dotted line circle 220. Also shown is an "interference-free" circle, solid line 230, which is constructed as a zone which does not substantially include any of the clusters 241, 242, 243, 244, 245, and 246 as shown by the heavy solid lines.

Because of the new value possible for the $D_c/R_c$ ratio, an entirely different cell configuration is made possible. This new cell configuration is shown in FIG. 7. Since the co-channel cell separation is significantly smaller than in the cell configuration of FIG. 6, the number of sets in a frequency reuse pattern is reduced. This number of sets can be established by setting D/R equal to 3 and K equal to 3. Using the frequency channel capacity equation given above, the result is an M of 131 channels per cell as compared to 56 for the conventional system shown in FIG. 3. The channel capacity of the system of FIG. 4 thereby represents an increase of a factor of 2.33 over the capacity of the system shown in FIG. 5.

Using a co-channel separation of D equal to 3R, and equations known in the art (see W.C.Y. Lee, *Mobile Cellular Telecommunications Systems*, McGraw-Hill 1989) for calculating interference reduction, a carrier to interference ratio improvement of between 1 and 2 dBs may be achieved for the system of FIG. 7 over the system of FIG. 5. Moreover, since in the system of the present invention, the transmitted power of the mobile units can be reduced compared to that in the case of the system of FIG. 5, a further improvement in the interference level is achieved.

It is seen, therefore, that the system of the present invention provides a substantial increase in channel capacity and a substantial reduction in interference levels over typical prior art systems. Various modifications of the invention, in addition to those shown and described herein, will become apparent to those skilled in the art from the foregoing description and accompanying drawings. Such modifications are intended to fall within the scope of the following claims.

What is claimed is:

1. A cellular telephone system comprising, a plurality of contiguous cells, said cells being arranged in a plurality of clusters wherein each cell in a cluster has an assigned set of transmission frequencies, each of which frequencies is assignable to a given mobile telephone within said cell for all locations of said given mobile telephone within said cell, frequency handoff means for maintaining continuous communication with mobile telephones moving from cell to cell by assigning thereto, respectively, a frequency from the corresponding assigned set as the mobile telephone moves into a new cells, each of said cells having a plurality of antenna means each of what is arranged and configured to limit propagation of signals substantially to one of a plurality of regions within the boundaries of said cell, which regions are each substantially less in area than the area of said cell but collectively occupy the entire cell area, and means for terminating transmission by said antenna means, at any one frequency in a given assigned set of transmission frequencies for said cells in all regions except for the region wherein the strongest signal is received by said antenna means from the mobile telephone to which such one frequency has been assigned, said clusters being arranged with a frequency reuse pattern of three and a ratio of co-channel separation distance to cell radius of less than four.

2. A cellular telephone system according to claim 1 wherein each of said sets of antennas comprises a plurality of sub-sets, each serving a substantially separate sector within the zone associated with said antenna set.

* * * * *

UNITED STATES PATENT AND TRADEMARK OFFICE
CERTIFICATE OF CORRECTION

PATENT NO. : 5,067,147
DATED : Nov. 19, 1991
INVENTOR(S) : William C. Lee, Corona Del Mar, Calif.

It is certified that error appears in the above-identified patent and that said Letters Patent is hereby corrected as shown below:

Column 5, line 33, after "done" delete "be".

Column 10, line 51, after "FIG" delete "3" and insert therefore --5--.

Column 10, line 52, after "FIG" delete "4" and insert therefore --7--.

Column 11, line 19, after "into" delete "a".

Column 11, line 21, delete "what" and insert *which*.

Signed and Sealed this

Twentieth Day of July, 1993

*Attest:*

MICHAEL K. KIRK

*Attesting Officer*     *Acting Commissioner of Patents and Trademarks*